(12) United States Patent
Molnar

(10) Patent No.: US 6,331,580 B1
(45) Date of Patent: Dec. 18, 2001

(54) MBS IMPACT MODIFIERS

(75) Inventor: Linda Katherine Molnar, Philadelphia, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/389,957

(22) Filed: Sep. 3, 1999

Related U.S. Application Data

(60) Provisional application No. 60/099,560, filed on Sep. 9, 1998.

(51) Int. Cl.⁷ .......................... C08F 255/00; C08F 12/00; C08F 257/00
(52) U.S. Cl. ........................... 523/201; 523/202; 525/70; 525/87
(58) Field of Search ................................... 523/201, 202; 525/70, 87

(56) References Cited

U.S. PATENT DOCUMENTS

| | | |
|---|---|---|
| 4,352,910 | 10/1982 | Katto et al. . |
| 4,393,172 | 7/1983 | Lindner et al. . |
| 4,443,585 | 4/1984 | Goldman . |
| 4,508,876 | 4/1985 | Takaki et al. . |
| 4,515,914 | 5/1985 | Tsurumi et al. . |
| 4,564,653 | 1/1986 | Kamata et al. . |
| 4,602,083 | 7/1986 | Hung . |
| 4,607,080 | 8/1986 | Yusa et al. . |
| 4,857,592 | 8/1989 | Hoshino et al. . |
| 5,188,751 | 2/1993 | Mori et al. . |
| 5,268,430 | 12/1993 | Wang . |
| 5,298,563 | 3/1994 | Ishiga et al. . |
| 5,334,660 | 8/1994 | Takakiki et al. . |
| 5,349,017 | 9/1994 | Matsumoto et al. . |
| 5,382,625 | 1/1995 | Lindner et al. . |
| 5,451,624 | 9/1995 | Memon et al. . |
| 5,521,252 | 5/1996 | Matsuda et al. . |
| 5,534,594 | 7/1996 | Troy et al. . |

FOREIGN PATENT DOCUMENTS

| | | |
|---|---|---|
| 270948 | 6/1988 | (EP) . |
| 0 390 144 | 3/1990 | (EP) . |
| 0577 281A2 | 5/1994 | (EP) . |
| 0737715A2 | 10/1996 | (EP) . |
| 48-17658 | 5/1973 | (JP) . |
| 52-032772 | 8/1977 | (JP) . |
| 58-152039 | 9/1983 | (JP) . |
| 60-38418 | 2/1985 | (JP) . |
| 4-106147 | 4/1992 | (JP) . |
| 5-262945 | 10/1993 | (JP) . |
| WO9736959 | 3/1997 | (WO) . |

Primary Examiner—Jeffrey Mullis
(74) Attorney, Agent, or Firm—Jeffrey H. Rosedale; Paul S. Chirgott

(57) ABSTRACT

A process and composition for MBS modifiers having (A) a rubbery core, (B) an inner graft stage comprised mainly of a hard polymer, (C) an intermediate sealer stage comprised mainly of an alkyl acrylate monomer and/or a polyunsaturated crosslinker, and (D) an outer shell to provide compatibility of the core-shell polymer with the matrix polymer, is disclosed. A process for preparing MBS impact modifiers having suprisingly improved impact performance in matrix polymers is also disclosed. Articles prepared from blends of matrix polymers and the MBS core-shell polymers described herein are also disclosed.

12 Claims, No Drawings

MBS IMPACT MODIFIERS

CROSS REFERENCE TO RELATED PATENT APPLICATIONS

This is a non-provisional application of prior pending U.S. provisional application serial No. 60/099,560 filed Sep. 9, 1998.

BACKGROUND

There is a need for core-shell emulsion polymers with a core or rubbery stage based on homopolymers or copolymers of butadiene for use as impact modifiers in matrix polymers such as acrylonitrile-butadiene-styrene ("ABS"), for styrene-acrylonitrile copolymers, in methyl methacrylate polymers, in poly(vinyl chloride) ("PVC"), in various engineering resins such as polycarbonate, polyesters, or polyamides, and in thermosetting resins such as epoxies. Such impact modifiers containing copolymers of butadiene and styrene and at least one stage or shell of poly(methyl methacrylate) are known in the art as methacrylate-butadiene-styrene ("MBS") core-shell polymers.

Although MBS impact modifiers are commercially available, there is a constant need to reduce the cost of manufacturing these impact modifiers while maintaining or improving the properties of the matrix resins that they are used in. Improved properties may include enhanced impact properties (e.g., PVC bottles that can withstand higher drop heights without breaking) and improved clarity and color in clear matrix polymer blends. Reducing manufacturing costs may arise from shorter process times and/or reducing the cost of powder recovery processes. It is desirable to use efficient emulsion recovery processes known in the art, such as spray-drying or coagulation. Coagulated MBS emulsions produce a slurry of coagulated core-shell polymer particles of varying particle size which must be further dried to produce MBS powders which are readily handled and added to matrix resins during blending and compounding processes. Commercially-viable average slurry particle sizes for generating powders are typically in the range of from about 100 microns to less than about 300 microns, and preferably between about 200 and 250 microns. A preferable average slurry particle size is needed to avoid problems related to dispersion in matrix polymers, formation of dust when handled, powder compaction, flowability, and wetcake drying.

U.S. Pat. No. 5,534,594, Troy et al. discloses an improved process for preparing core-shell MBS modifiers wherein feeds of the monomers which form the second and/or third stage polymers are added prior to completion of polymerization of the earlier stages. Although the Troy process substantially reduces polymerization time, I discovered that commercially viable latex core-shell polymer emulsions, having a butadiene-based core weight fraction of greater than about 70% and a first stage core monomer conversion less than 75%, provide slurries undesirably having an average particle size greater than about 300 microns when coagulated at temperatures greater than about 20° C. Because slurry particle size typically increases with increasing temperature, commercially-viable impact modifiers which follow the Troy process require coagulation temperatures below 20° C. in order to provide slurries having a desirable average particle size less than about 300 microns.

Coagulating below about 20° C. is a problem as it precludes the use of efficient commercial-scale cooling processes. While Troy discloses coagulation ("Method B") as a possible isolation method, Troy is not concerned with maintaining a desirable average slurry particle size. When core-shell polymers made according to Troy are coagulated at temperatures at or above about 20° C., the average slurry particle size frequently exceeds about 300 microns. Moreover, the "Method A" isolation process described by Troy (freeze drying of emulsion followed by vacuum drying) is not amenable for commercial production.

The ability of a particular MBS core-shell polymer to increase the impact strength of a matrix polymer generally increases, up to a point, as the rubbery core weight fraction increases, generally to at least 70%. However, as the core weight fraction increases there is a corresponding decrease in the weight fraction, thickness, and hardness of the outer polymer shell. If the shell becomes too thin, it will not properly cover the rubber core.

Improper shell coverage also arises as described in *Makromol. Chem., Macromol. Symp.* 35136, 307–325 (1990). Improper shell coverage in MBS polymers is also exacerbated by the presence of unreacted monomer in the shell, which reduces the glass transition ("Tg") of the shell. Ultimately, improper shell coverage leads to problems with powder isolation (e.g., inability to spray dry or coagulate, or very large slurry particle size), and reduced impact strength in matrix polymer blends. These problems usually become apparent when the rubbery core weight fraction exceeds about 70% to 75%.

I have discovered that a certain amount of an alkyl acrylate and/or crosslinking monomer polymerized between the inner graft stage and the outer shell decreases the average slurry particle size of coagulated multistage MBS core-shell polymers having a rubbery core weight fraction exceeding about 70% to a commercially-viable range (less than about 300 microns at coagulation temperatures above 20° C.).

I have also discovered that core-shell polymers prepared at reaction temperatures in the range of from 60° C. to 70° C. provide a suprisingly large improvement in impact properties in matrix polymer blends.

The object of the present invention is to provide MBS core-shell polymers having a rubbery core weight fraction exceeding about 70% and a slurry particle size smaller than 300 microns when coagulated above 20° C. for use as impact modifiers in matrix resins. A further object is to provide an improved impact modifier having a rubbery core weight fraction exceeding about 70% and a slurry particle size smaller than 300 microns when coagulated above 20° C. for optically clear PVC compositions. Another object of the invention is to provide thermoplastic blends and articles comprising matrix polymers and the MBS core-shell polymers of this invention having a suprisingly large improvement in impact properties. A still further object is to provide a process for preparing core-shell MBS impact modifiers having a rubbery core weight fraction exceeding about 70%, a slurry particle size smaller than 300 microns when coagulated above 20° C., and a suprisingly large improvement in impact properties when blended with matrix resins. These and other objects as will become apparent from the following disclosure are achieved by the present invention.

STATEMENT OF THE INVENTION

In the present invention, the impact strength of matrix polymers such as acrylonitrile-butadiene-styrene ("ABS"), styrene-acrylonitrile copolymers, methyl methacrylate polymers, PVC, polycarbonate, polyesters, or polyamides, and the like, or combinations of such matrix polymers, is substantially increased by the addition of small amounts of certain core-shell modifiers having a rubbery core fraction greater than about 70%. Additionally, the present invention provides an MBS core-shell composition having a rubbery core weight fraction exceeding about 70% and having an average slurry particle size smaller than about 300 microns when coagulated above 20° C., as well as providing improvements in impact properties to matrix polymers over that taught in the prior art. Specifically, the present invention provides core-shell MBS impact modifiers that have a rubbery core weight fraction exceeding about 70% and have an average slurry particle size smaller than about 300 microns when coagulated above 20° C. which can be blended with PVC to prepare plastic bottles having excellent transparency, low haze, low color reversal, and high impact strength evidenced by reduced breakage when dropped.

The impact modifier of this invention is a core-shell polymer with (A) a rubbery core such as a copolymer containing a diolefin, (B) an inner graft stage comprised mainly of a hard polymer such as a polymer containing a vinyl aromatic monomer, (C) an intermediate sealer stage comprised mainly of an alkyl acrylate monomer and/or a polyunsaturated crosslinker, and (D) an outer shell comprised mainly of alkyl methacrylate monomers (such as methyl methacrylate) to provide compatibility of the core-shell polymer with the matrix polymer.

The impact modifier of the present invention comprises:
(A) from about 70 to about 85 parts of a core comprising from about 15 to about 35 percent by weight of units derived from at least one vinyl aromatic monomer, and from about 65 to about 85 percent by weight of units derived from at least one diolefin monomer;
(B) from about 8 to about 14 parts of an inner graft stage comprising at least one vinyl aromatic monomer or at least one C1–C4 alkyl methacrylate monomer;
(C) from about 0.1 to about 5 parts of an intermediate sealer stage comprising at least one monomer selected from a C1–C8 alkyl acrylate or a polyunsaturated crosslinker; and
(D) from about 10 to about 16 parts of an outer shell comprising at least one C1–C4 alkyl (meth)acrylate monomers or at least one vinyl aromatic monomer.

Another aspect of the invention is the blending of the impact modifier composition with at least one matrix polymer at a weight ratio of about 99:1 to about 70:30 of matrix polymer: impact modifier. A still further aspect of the invention comprises molded parts, bottles, sheet, films, pipes, foams, containers, profiles, or other articles prepared in accordance with the above-mentioned compositions and blends.

I have also discovered a process for preparing core-shell impact modifiers having an average slurry particle size below about 300 microns when coagulated above 20° C. which comprises:
(A) polymerizing in emulsion, from about 70 to about 85 parts of a first mixture of monomers, comprising from about 65% to about 85% of a diolefin monomer and about 15% to about 35% of at least one vinyl aromatic monomer, in the presence of an emulsifier and a free-radical initiator, until 60%–90% conversion of the monomers to polymer has been achieved;
(B) continuing the polymerization of the first mixture of monomers while adding from about 8 to about 14 parts of a second mixture of monomers which mixture comprises at least one vinyl aromatic monomer or a C1–C4 alkyl methacrylate monomer;
(C) continuing the polymerization of the second mixture of monomers to at least 90 % conversion to polymer has been achieved;
(D) adding from about 0.1 to about 5 parts of a third mixture of monomers and a free-radical initiator which mixture comprises at least one monomer selected from a C1–C8 alkyl acrylate or a polyunsaturated crosslinker; and
(E) adding from about 10 to about 16 parts of a fourth mixture of monomers, which mixture comprises at least one C1–C4 alkyl methacrylate monomer or at least one vinyl aromatic monomer, adding a free-radical initiator, and continuing the polymerization until at least 95% conversion to polymer has been achieved, wherein the reaction temperature during steps (A) through (E) is in the range of from 20° C. to 100° C.

I have also discovered a process for preparing core-shell impact modifiers providing suprisingly improved impact properties in matrix polymer blends, which comprises:
(A) polymerizing in emulsion, from about 70 to about 85 parts of a first mixture of monomers, comprising from about 65% to about 85% of a diolefin monomer and about 15% to about 35% of at least one vinyl aromatic monomer, in the presence of an emulsifier and a free-radical initiator, until 60%–90% conversion of the monomers to polymer has been achieved;
(B) continuing the polymerization of the first mixture of monomers while adding from about 8 to about 14 parts of a second mixture of monomers which mixture comprises at least one vinyl aromatic monomer or a C1–C4 alkyl methacrylate monomer;
(C) continuing the polymerization of the second mixture of monomers to at least 90 % conversion to polymer has been achieved; and
(D) adding from about 10 to about 16 parts of a third mixture of monomers, which mixture comprises at least one C1–C4 alkyl methacrylate monomer or at least one vinyl aromatic monomer, adding a free-radical initiator, and continuing the polymerization until at least 95% conversion to polymer has been achieved,
wherein the reaction temperature during steps (A) through (D) is in the range of from 60° C. to 70° C.

A further variation in either process of preparing core-shell impact modifiers is to polymerize the first mixture of monomers in the presence of a pre-formed polymer dispersion ("seed" latex), for control of desired particle size or for structural modification of the resulting polymer. The "seed" latex is often of small particle size, such as below 100 nm. The pre-formed polymer dispersion may be a polymer of a rubbery material, such as poly(butadiene), and may be similar or different in composition to the core polymer. Alternatively, it may be a hard non-rubbery polymer of e.g., polystyrene or poly(methyl methacrylate), present to adjust the refractive index, as taught in Myers et al., U. S. Pat. No. 3,971,835.

A further variation in either process is the addition of an agglomerating agent during step (A) after 60%–90% conversion of the first mixture of monomers to polymer having a particle size of 70–110 nm.

As used throughout this document, the term "stage" is intended to encompass its broadest possible meaning, including the meaning conveyed in prior art such as U.S. Pat. Nos. 3,793,402, 3,971,835, 5,534,594, and 5,599,854, which offer various means for achieving "staged" polymers.

As used throughout this document, the term "mixture" is intended to encompass a combination of one or more chemical compounds.

As used throughout this document, the term "parts" is intended to mean "parts by weight".

Further, the invention encompasses having other or additional stages, which are polymerized after the formation of the inner graft stage is completed and excess pressure is vented. Such stages may include an additional rubbery stage of a diolefin polymer, or a poly(alkyl acrylate), or additional outer stages of polymer mainly or exclusively polymerized from styrene, methyl methacrylate, or styrene/methyl methacrylate copolymer.

DETAILED DESCRIPTION OF THE INVENTION

It has been found that the impact strength of matrix polymers such as acrylonitrile-butadiene-styrene ("ABS") copolymers, styrene-acrylonitrile copolymers, methyl methacrylate polymers, poly(vinyl chloride) ("PVC"), various engineering resins such as polycarbonate, polyesters, or polyamides, and thermosetting resins such as epoxies, or combinations of these matrix polymers, is substantially increased by the addition of small amounts of certain MBS core-shell modifiers. The MBS core-shell modifiers of the present invention have a core weight fraction greater than about 70%, a slurry particle size smaller than about 300 microns when coagulated above 20° C., and provide improvements in impact properties to matrix polymers over that taught in the prior art. These impact modifiers have (A) a rubbery core such as a copolymer containing a diolefin, (B) an inner graft stage comprised mainly of a hard polymer such as a polymer containing a vinyl aromatic monomer or a C1–C4 alkyl methacrylate, (C) an intermediate sealer stage comprised mainly of an alkyl acrylate monomer and/or a polyunsaturated crosslinker, and (D) an outer shell comprised mainly of a C1–C4 alkyl methacrylate or vinyl aromatic monomers (such as methyl methacrylate) to provide compatibility between the core-shell polymer and the matrix polymer.

The core of the impact modifier composition of the present invention is a rubbery polymer and generally comprises a copolymer of a diolefin and a vinyl aromatic monomer. Preferable diolefin monomers include 1,3-dienes such as butadiene and isoprene. The rubbery polymer may include 1,3-diene rubber copolymers (e.g., butadiene-styrene copolymer, butadiene-styrene-(meth)acrylate terpolymers, butadiene-styrene-acrylonitrile terpolymers, isoprene-styrene copolymers, etc.). Of the aforementioned rubbery polymers, those which can be produced as a latex are especially desirable. In particular, a butadiene-vinyl aromatic copolymer latex obtained as a result of emulsion polymerization is preferred. In the core, a partially crosslinked polymer can also be employed if crosslinking is moderate. Further, cross- or graft-linking monomers, otherwise described as a multi-functional unsaturated monomer, may also be copolymerized in the core. Such cross- or graft-linking monomers include divinylbenzene, diallyl maleate, butylene glycol diacrylate, ethylene glycol dimethacrylate, allyl methacrylate, and the like.

The ratio of comonomers in the core depends on the desired refractive index ("RI") of the core-shell polymer and the desired rubber phase hardness. The ratio range of diolefin to the vinyl aromatic in the core polymer is 95:5 to 20:80, preferably 85:15 to 65:45 (parts by weight). If the quantity of butadiene is below 20 parts by weight, it is difficult to improve the impact resistance. If the quantity of butadiene exceeds 95 parts by weight, on the other hand, it may be difficult to obtain a modifier having an RI high enough to match that of the matrix polymer for clear impact-modified polymer blends, such as clear PVC. Optionally, a small concentration, from about 0 to about 5 percent by weight of a crosslinking monomer, such as divinylbenzene or butylene glycol dimethacrylate is included, and optionally about 0 to about 5 percent by weight of a graftlinking monomer for tying the core and shell together, such as allyl maleate may be included in the rubbery core polymer. Further examples of crosslinking monomers include alkanepolyol polyacrylates or polymethacrylates such as ethylene glycol diacrylate, ethylene glycol dimethacrylate, butylene glycol diacrylate, oligoethylene glycol diacrylate, oligoethylene glycol dimethacrylate, trimethylolpropane diacrylate, trimethylolpropane dimethacrylate, trimethylol-propane triacrylate or trimethylolpropane trimethacrylate, and unsaturated carboxylic acid allyl esters such as allyl acrylate, allyl methacrylate or diallyl maleate.

Particle sizes of the core may be as low as 90 nm, and as high as 300 nm, although 120–240 nm is preferred for impact-modified polymer blends.

As the inner graft stage of the impact modifier composition, polymers or copolymers with a Tg above room temperature can generally be used. Hard polymers or copolymers of vinyl aromatic and C1–C4 alkyl methacrylate monomers are preferred. This stage is present in amount of from about 8 to about 14 parts.

Examples of suitable vinyl aromatic monomers for the inner graft stage include alpha-methyl styrene, para-methyl styrene, chlorostyrene, vinyl toluene, dibromostyrene, tribromostyrene, vinyl naphthalene, isopropenyl naphthalene, divinyl benzene, and preferably styrene. Examples of the C1–C4 alkyl methacrylate monomers are ethyl methacrylate, propyl methacrylate, butyl methacrylate, and preferably methyl methacrylate.

Optionally, one or more additional monomers copolymerizable with the C1–C4 alkyl methacrylate and vinyl aromatic monomers may also be used in the inner graft stage. The additional monomer may include one or more of any of the following monomers: acrylonitrile, methacrylonitrile, methyl acrylate, ethyl acrylate, propyl acrylate, butyl acrylate, 2-ethylhexyl acrylate, decyl acrylate, methyl methacrylate, ethyl methacrylate, divinyl benzene, alpha-methyl styrene, para-methyl styrene, chlorostyrene, vinyl toluene, dibromostyrene, tribromostyrene, vinyl naphthalene, isopropenyl naphthalene, as well as higher carbon (C12–C20) alkyl methacrylates and acrylates such as lauryl methacrylate, lauryl acrylate, stearyl methacrylate, stearyl acrylate, isobornyl methacrylate. Additionally, the C1–C4 alkyl methacrylate monomers and vinyl aromatic monomers may be used either singly or in combination with each other.

Optionally, one or more additional monomers may be added to the inner graft stage to adjust the RI. This additional monomer can be any monomer which copolymerizes with the other two monomers used in the core polymer and produces a terpolymer which permits the RI of the modifier to match that of the matrix polymers with which it is blended.

The intermediate sealer stage is added to ensure that the impact modifiers of the present invention have an average slurry particle size smaller than about 300 microns when coagulated above 20° C. This stage is present in an amount of from 0.1 to about 5 parts, preferably from 0.5 to 2 parts. Monomers useful for forming the intermediate sealer stage include at least one monomer selected from a C1–C8 alkyl acrylate or a polyunsaturated crosslinker. Surprisingly, amounts of the intermediate sealer stage within the range of 0.1 to 5.0 parts added to a core-shell composition improves the coverage of the outer shell on the inner stage and core, which results in smaller average slurry particle sizes.

Suitable C1–C8 alkyl acrylate monomers in the intermediate sealer stage include methyl acrylate, ethyl acrylate, propyl acrylate, 2-ethylhexyl acylate, n-octyl acrylate, and preferably butyl acrylate.

Suitable polyunsaturated crosslinkers in the intermediate sealer stage include butylene glycol dimethacrylate, alkanepolyol polyacrylates or polymethacrylates such as ethylene glycol diacrylate, ethylene glycol dimethacrylate, butylene glycol diacrylate, oligoethylene glycol diacrylate, oligoethylene glycol dimethacrylate, trimethylolpropane diacrylate, trimethylolpropane dimethacrylate, trimethylolpropane triacrylate or trimethylolpropane trimethacrylate, and unsaturated carboxylic acid allyl esters such as allyl acrylate, allyl methacrylate or diallyl maleate, and preferably divinyl benzene.

As the outer shell of the impact modifier composition, hard polymers or copolymers with a Tg above room temperature are suitable, and polymers prepared with C1–C4 alkyl methacrylate and vinyl aromatic monomers are preferred. Examples of suitable vinyl aromatic monomers include styrene, alpha-methyl styrene, para-methyl styrene, chlorostyrene, vinyl toluene, dibromostyrene, tribromostyrene, vinyl naphthalene, isopropenyl naphthalene, divinylbenzene and the like. Examples of the C1–C4 alkyl methacrylate monomers are ethyl methacrylate, propyl methacrylate, butyl methacrylate, and preferably methyl methacrylate.

Optionally, one or more additional monomers copolymerizable with the C1–C4 alkyl methacrylate and vinyl aromatic monomers may also be used in the outer shell composition. The additional monomer may include one or more of any of the following monomers: acrylonitrile, methacrylonitrile, methyl acrylate, ethyl acrylate, propyl acrylate, butyl acrylate, 2-ethylhexyl acrylate, decyl acrylate, methyl methacrylate, ethyl methacrylate, divinyl benzene, alpha-methyl styrene, para-methyl styrene, chlorostyrene, vinyl toluene, dibromostyrene, tribromostyrene, vinyl naphthalene, isopropenyl naphthalene, as well as higher carbon (C12–C20) alkyl methacrylates and acrylates such as lauryl methacrylate, lauryl acrylate, stearyl methacrylate, stearyl acrylate, isobornyl methacrylate. Additionally, the C1–C4 alkyl methacrylate monomers and vinyl aromatic monomers may be used either singly or in combination with each other.

Optionally, one or more additional monomers may be added to the shell to adjust the RI. This additional monomer can be any monomer which copolymerizes with the other two monomers used in the core polymer and produces a terpolymer which permits the RI of the modifier to match that of the matrix polymers with which it is blended. For example, where the matrix polymer is PVC, it is preferable that the overall RI of the core-shell polymer is in the range of from 1.52 to 1.55 to prepare clear impact-modified PVC blends.

In preparing a core-shell impact modifier emulsion having a rubbery core weight fraction exceeding about 70% and an average slurry particle size smaller than about 300 microns when coagulated above 20° C.; the first step involves polymerizing a first mixture of monomers of a diolefin monomer and at least one vinyl aromatic monomer in the presence of an emulsifier and a free-radical initiator, at a temperature between 20° C. and 100° C. in emulsion until 60%–90% conversion of the monomers to polymer has been achieved to form the rubbery core.

Suitable diolefin monomers which form the rubbery core include the 1,3-dienes, preferably butadiene. Suitable vinyl aromatic monomers which copolymerize with the diolefin monomers in the rubbery core include paramethyl styrene, alpha-methyl styrene, chlorostyrene, vinyl toluene, bromostyrene, dibromostyrene, tribromostyrene, isopropenyl napthalene, vinyl naphthalene, and preferably styrene.

In the first step, the first mixture of monomers may be added batchwise or fed continuously over time into the reactor. Continuous feeding is preferred as it allows better control of the reaction temperature. Typically, the first mixture of monomers is fed into the reactor over times between 2 and 12 hours.

Suitable emulsifiers include those conventionally used in emulsion polymerization, especially of diolefin monomers, and include salts of alkyl, aryl, aralkyl, or alkaryl sulfates or sulfonates, alkylpoly(alkoxyalkyl) ethers, alkylpoly (alkoxyalkyl) sulfates, or alkali salts of long-chain fatty acids such as potassium oleate. If the butadiene polymer latex is to be agglomerated (see below), it is preferred to use an ionic emulsifier, and especially preferred to use a fatty acid soap, which systems, having a pH above 7, may be partially destabilized and microagglomerated by lowering the pH.

The free-radical initiators which may be used in the various steps of the process are those conventionally utilized in free-radical polymerizations conducted in the temperature range from about room temperature to about 100° C.; preferably from 55° C. and 80° C. Suitable initiators include thermally-activated initiators, such as persulfates, peroxides, or peroxyesters. Suitable initiators also include "redox" initiators, such as oxidants such as hydroperoxides, persulfates, or peroxides, in combination with reductants such as sodium formaldehyde sulfoxylate, sodium sulfite, sodium hydrosulfite, or isoascorbic acid. An oil-soluble initiator having a water solubility less than styrene (3.5 mM at 25° C.–50° C.), is preferred, examples of which include diisopropylbenzene hydroperoxide, t-butyl perbenxoate, tert-butylperoxy isopropylcarbonate, t-butyl peroxyisobutyrate, t-butyl peroctoate, diisopropyl peroxy dicarbonate, di(2-ethylhexyl)peroxy dicarbonate, and the like. Redox reactions may also be promoted by reagents such as iron salts, for example ferrous iron-ethylene-diamine tetraacetic acid ("Fe-EDTA").

The second step involves continuing the polymerization of the first mixture of monomers while adding a second mixture of monomers having at least one vinyl aromatic monomer or a C1–C4 alkyl methacrylate monomer to form the inner graft stage. The second mixture is added after the first mixture of monomers for the core have reached a conversion of from 60% to 90%. This core monomer conversion range is important for controlling the overall process efficiency. If the core monomer conversion is higher than 90% prior to adding the second mixture of monomers, then the core reaction time becomes very long leading to greater cost. If the core monomer conversion is lower than 60% when the second mixture of monomers is added, then the outer shell coverage will become poorer leading to lower coagulation temperatures and reduced compatibility with the matrix resin.

Suitable vinyl aromatic C1–C4 alkyl methacrylate monomers for the second mixture were described earlier. The second mixture of monomers may be added batchwise or fed continuously over time into the reactor to form the inner graft stage. Continuous feeding is preferred as it allows better control of the reaction temperature. Additional emulsifier and initiator may also be added simultaneously; suitable emulsifiers and initiators are listed above for the step to prepare the core, and may be the same or different. Typically, the second mixture of monomers, emulsifiers, and initiators are fed into the reactor over times between 1 and 10 hours at temperatures between 20° C. and 100° C. It is preferred that the reaction temperatures are between 55° C. and 85° C.; below 55° C. the reaction rates become slow, and above 85° C. an increased amount of self-crosslinking in the core occurs. Increased crosslinking in the core, either promoted by a crosslinking monomer or self-crosslinking promoted by high reaction temperatures undesirably leads to reduced impact properties.

The third step involves continuing the polymerization of the second mixture of monomers for the inner graft stage until at least 90% of the total monomers have been converted to polymer. This step usually takes an additional 1 to 24 hours at temperatures between 20° C. and 100° C.; preferably for 2–6 hours at temperatures between 55° C. and 80° C. It is also desirable to feed in additional initiator and emulsifier to achieve at least 90% conversion. Degree of conversion is determined by analysis of the solids fraction of the emulsion. After at least 90% conversion has been achieved, the reactor may be vented to prevent the polymerization of unreacted butadiene in the later stages. If the conversion is greater than 99%, then venting is not required. However, because achieving greater than 99% conversion is expected to take an undesirably long amount of time, the reactor is preferably vented at conversions in the range of from 90% to 98%.

The fourth step involves adding a third mixture of monomers having at least one monomer selected from a C1–C8 alkyl acrylate monomer or a polyunsaturated crosslinker, and initiator to form the intermediate sealer stage. The intermediate sealer stage is added to ensure that the impact modifiers of the present invention have an average slurry particle size smaller than about 300 microns when coagulated above 20° C. This stage is present in an amount of from 0.1 to about 5 parts, preferably from 0.5 to 2 parts. Monomers useful for forming the intermediate sealer stage include at least one monomer selected from a C1–C8 alkyl acrylate and a polyunsaturated crosslinker, as described above. Preferably, the C1–C8 alkyl acrylate monomer is butyl acrylate and the polyunsaturated crosslinker is divinylbenzene. Where the degree of conversion of the core is between 60% and 80%, it is preferred to use a mixture of from 0.4 to 1.5 parts butyl acrylate and from 0.1 to 0.5 part divinylbenzene. The third monomer mixture is added to the reactor at a temperature between 20° C. and 100° C; preferably between 55° C. and 80° C. and reacted for between 30 minutes and 4 hours, preferably between 1 and 2 hours. Preferably, additional initiator and emulsifier are fed into the reactor with the monomers. Additional initiator and emulsifier may be mixed in with the monomers to form an emulsified monomer mix when added to the reactor, or added separately. Suitable initiators and emulsifiers for this step are the same described above, and may be the same or different from the other steps.

The fifth step involves adding a fourth mixture of monomers having at least one C1–C4 alkyl methacrylate monomer or a vinyl aromatic monomer, adding an initiator, and continuing the polymerization until at least 95% conversion to polymer has been achieved to form the outer shell and complete the preparation of the core-shell polymer. The fourth monomer mixture is added to the reactor at a temperature between 20° C. and 100° C.; preferably between 55° C. and 80° C.; and reacted from between 30 minutes and 4 hours, preferably between 1 and 2 hours. It is also preferred to feed additional initiator and emulsifier into the reactor with the monomers. Additional initiator and emulsifier may be mixed in with the monomers to form an emulsified monomer mix when added to the reactor, or added separately. Suitable monomers for preparing the outer shell of the impact modifier composition are those which form hard polymers or copolymers with a Tg above room temperature, and preferably are selected from C1–C4 alkyl methacrylate and vinyl aromatic monomers. Examples of suitable monomers and optional additional monomers copolymerizable with the C1–C4 alkyl methacrylate and vinyl aromatic were provided above.

Optionally, one or more chain transfer agents may be incorporated during any of the aforementioned process steps to control the degree of polymerization. Common chain transfer agents or mixtures thereof known in the art, such as alkyl mercaptans are employed to control molecular weight.

To prepare core-shell impact modifiers providing suprisingly improved impact properties to matrix polymer blends, the core-shell polymers are made at a temperature in the range of from 60° C. to 70° C. Preferably, an oil-soluble initiator is used during this process.

The following variations apply to the aforementioned composition as well as to both processes:

Optionally, one or more additional monomers may be added to the shell to adjust the RI. This additional monomer may be any monomer which copolymerizes with the fourth monomer mixture to permit the RI of the modifier to match that of the matrix polymer in which it is blended. Suitable additional monomers for controlling RI were provided above.

The first mixture of monomers may be polymerized in the presence of a pre-formed polymer dispersion ("seed" latex), for control of desired particle size or for structural modification of the resulting polymer. The "seed" latex is often of small particle size, such as below 100 nm, and of a composition similar to that of the rubbery phase to be formed. The pre-formed polymer dispersion may be a polymer of a rubbery material, such as poly(butadiene), and may be similar or different in composition to the core polymer. Alternatively, it may be a hard non-rubbery polymer of e.g., polystyrene or poly(methyl methacrylate), present to adjust the refractive index, as taught in Myers et al., U. S. Pat. No. 3,971,835.

An agglomerating agent may also be added to control the core particle size after 60%–90% conversion of the first mixture of monomers to polymer having a particle size of 70–110 nm. Agglomeration may be accomplished in several ways, such as by controlled adjustment of solids, by extensive shear of the emulsion, or by carefully controlled addition of electrolytes such as water-soluble salts of inorganic acids such as sodium chloride, potassium hypophosphite, potassium chloride, or sodium phosphate. It is preferred to utilize as the emulsifier an alkali salt of a fatty acid, whether or not agglomeration is employed, and it is separately preferred that the agglomerating agent be an acid, such as hydrochloric acid, acetic acid, or phosphoric acid. If acid is used, it is preferred that, after the agglomeration, sufficient alkali hydroxide be added to restore the pH to the value present prior to the agglomeration step.

The acids used to adjust pH and/or to accomplish agglomeration may be any of a number of organic or inorganic acids, preferably water-soluble, such as hydrochloric, sulfuric, phosphoric, acetic, methanesulfonic, or tartaric. Agglomeration may also be accomplished by controlled addition of salts such as sodium chloride or potassium chloride. It is known to agglomerate with polymeric acids, such as ethyl acrylate/methacrylic acid copolymers, but these tend to cause excessive dilution of the reaction and to create a broader particle size distribution of the agglomerate, sometimes less desirable in certain "clear" polymer blend applications.

The core-shell polymers may be isolated from the emulsion in various ways, the preferred methods being spray-drying or coagulation, such as with electrolyte addition. Any of various techniques disclosed in the literature, such as U.S. Pat. No. 4,897,462, may also be applied to the emulsion during isolation to produce a spheroidal product which, when dried, exhibits outstanding powder flow, low dusting, and higher bulk density than conventionally isolated powders. The average slurry particle size is in the range of from about 100 to about 300 microns, preferably in the range of from about 200 to about 250 microns. A preferable average slurry particle size is needed to avoid problems related to dispersion in matrix polymers, formation of dust when handled, powder compaction, flowability, and wetcake drying. In conventional coagulation processes for MBS core-shell polymers, average slurry particle size generally increases in coagulation temperature.

Because butadiene polymers are sensitive to thermal decomposition when dried or processed at high temperatures, one or more thermal stabilizers may be added during isolation, and during blending with a matrix polymer. Suitable thermal stabilizers include octadecyl 3,5-di-t-butyl-4-hydroxyhydrocinnamate, and the reaction product of 2-t-butyl-5-methylphenol with crotonaldehyde. The thermal stabilizers may also contain additional emulsifiers, such as epoxidized soybean oil, to aid emulsification.

The core-shell polymers of the present invention may be used in various ways. They may be admixed with poly(vinyl chloride) to improve impact strength for many uses, such as calendered sheet, injection molded articles, blow-molded articles, or extruded articles. When the component monomers of the core-shell polymer are added in a way that the refractive indices are carefully matched, the resulting polymers are useful in clear packaging applications, such as for containers surrounding marketed articles for store use, for packaging food, and for clear bottles for packaging liquids, such as water. The core-shell modifiers of the present invention are especially useful for PVC bottles where drop-impact resistance is needed.

The polymers may be admixed with many other polymeric matrices, such as polymers of methyl methacrylate, with styrene-acrylonitrile copolymers, with aromatic polyesters, such as poly(ethylene terephthalate) or poly (butylene terephthalate), with polycarbonates, with polyamides, or with polyacetals. The utility of such blends is varied, but include equipment panels and housings, such as for appliances or computers and automobile parts such as panels.

EXAMPLES

Apparatus and General Procedure

In the following Examples, the core-shell polymers were prepared in an appropriate stirred pressure kettle able to withstand pressure of 1360 kPa (200 psig), and equipped with a pressure blow-out disk, stirrer, means for venting the reactor, means for dropping the formed polymer emulsion to a container, means for recording temperature, means for adding emulsifier solution, means for adding initiator, and means for adding monomers under pressure.

Particle size of the emulsion particles was measured using a Nanosizer BI-90. Emulsion particle size was 175 nm +/−10 nm for all examples.

The stabilizer system used in all of the following Examples was a mixture of epoxidized soybean oil, octadecyl 3,5-di-t-butyl-4-hydroxyhydrocinnamate, and the reaction product of 2-t-butyl-5-methylphenol with crotonaldehyde. The core-shell polymers for each example were coagulated by adding the emulsions to a well-stirred 0.3 to 1% hydrochloric acid solution at a temperature between 20° C. and 35° C.; adding 1.5 parts of a dilute latex of a MMA/ethyl acrylate (90/10) emulsion, followed by pH adjustment to 5.5, heating the slurry to 60° C.; dewatering the wetcake, re-washing the wetcake with water, adjusting the pH to 2.7 and re-filtering and drying. The average particle size of the slurry was determined using a Malvern 2600 Series Particle Size Analyzer (Malvern Instruments, Worcestershire, England).

The core-shell polymers were blended into the PVC bottle formulation indicated in Table 1 in a high speed rotary mixer. These blends were compounded on a 1 ¼"single screw extruder and pelletized. The pellets were extrusion blow molded into 16 oz. Boston round bottles on a Bekum BAE-1 extrusion blow molder. The bottles were tested for drop impact as described in ASTM D-2463, Procedure C, Cumulative Drop Impact Method. Additionally, panels cut from these bottles were tested for light transmission and color as described in ASTM D-1003 using a Hunter Lab D-25 calorimeter. The blue/yellow hue of the bottle panels were measured two ways. First, the "b" value of the Hunter L,a,b scale was measured. The Hunter "b" value measures yellowness-blueness, and the procedure for determining this value is provided in Instruction Manual: HUNTERLAB TRISTIMULUS COLORIMETER MODEL D25P-9 (rev. A). The Hunter "b" values for all of the PVC/core-shell bottles tested ranged between 0.5 and 1.1. The second parameter measured is referred to as the Scattered Yellowness Index ("SYI"). The SYI was calculated according to the Yellowness Index ("YI") procedure of ASTM-D-1925, using diffused (scattered) transmission values instead of total transmission values. The SYI values for all of the PVC/core-shell bottles tested ranged between −54.3 and −23.2. Total light transmission "Y" and percent haze "% Haze" were also measured; the Y values for all of the PVC/core-shell bottles tested ranged between 87.1 and 89.9, and the % Haze values for all of the PVC/core-shell bottles tested ranged between 3.0 and 4.6. These optical results indicate that all of the core-shell polymers tested were suitable for preparing clear PVC bottles.

TABLE 1

| PVC Bottle Formulation for Testing Physical Properties | |
| --- | --- |
| Ingredient | Use Level (phr) |
| PVC (K = 57) | 100.00 |
| Methyltin Mercaptide Stabilizer | 1.50 |
| Glycerol Monosterate (internal lubricant) | 1.00 |
| Polyethylene Wax (external lubicant) | 0.20 |
| High MW MMA/EA Processing Aid | 1.50 |
| MMA/EA Lubricating Processing Aid | 1.00 |
| Toner-blue (1% in PVC) | 0.06 |
| Impact Modifier (test sample) | 13.00 |

The following examples and comparative examples are presented to illustrate the invention, but the invention should not be limited by these examples. All parts and percentages are by weight unless otherwise indicated. The following abbreviations are employed in the examples:

Bd=butadiene
BA=butyl acrylate
MMA=methyl methacrylate
St=styrene
DVB=divinyl benzene
CHP=cumene hydroperoxide
DIBHP=di-isopropylbenzyl hydroperoxide
TBIC=tert-butylperoxy isopropylcarbonate
t-BHP=tert-butyl hydroperoxide
TSPP=tetrasodium pyrophosphate
Fe-EDTA=ferrous iron-ethylene-diamine tetraacetic acid
SFS=sodium formaldehyde sulfoxylate
KOL=potassium oleate
phr=per hundred parts resin (PVC)

In the description of the compositions, a single slash ("/") implies a copolymer, numbers separated by a single slash within parentheses indicates the copolymer ratio of the particular stage, while a double slash ("//") implies a separate stage. The general format for describing the core-shell polymer compositions is thus "core composition" // "inner graft stage composition" // "intermediate sealer stage" // "outer shell composition".

Example 1

The composition of this example is Bd/Sty//Sty//MMA in a weight ratio of 76(75/25)//11//13 and contains no intermediate sealer stage. The core monomer conversion was 70%.

To a suitable reactor was charged deionized water 6310 parts, TSPP 118 parts of a 5.0% solution, Bd/Sty 7/3 seed 722 parts of a 33% emulsion, sodium hydroxide 13 parts of 2.5% solution (or as needed for pH target of 9.8 to 10.0), Fe-EDTA 0.15 parts and deionized water 250 parts to rinse while stirring. The reactor was heated to 65° C. At 65° C.; Bd 4845 parts and Sty 1615 parts were fed to the reactor simultaneously with DIBHP (53% active) 49 parts, SFS 582 parts of 2.0% solution and KOL 469 parts of a 15.5% solution; this step prepared the core of the core-shell polymer. At a core monomer conversion of 70%, styrene 935 parts were fed to the reactor with DIBHP (53% active) 28 parts, SFS 342 parts of a 2.0% solution and KOL 275 parts of a 15.5% solution to form the inner graft stage. Additional SFS 166 parts of a 2.0% solution and DIBHP (53% active) 14 parts were added at the end of the styrene feed. The reaction was conducted at 65° C. for approximately 13 hours to ensure >95% styrene conversion. The reactor was vented at the end of this inner graft stage. Afterwards, MMA 1105 parts and deionized water 350 parts were added. DIBHP (53% active) 18 parts and SFS 208 parts of a 2.0% solution were fed simultaneously to form the outer shell. This reaction was conducted for 4–5 hours to a conversion of 97–100%. The reaction was cooled to 40° C. and then stabilized as described previously. An emulsion of 48–50% solids was obtained.

Example 2

The composition of this example is Bd/Sty //Sty//BA/DVB//MMA in a weight ratio of 76(75/25)//11 //1.5(67/33)//13. The core monomer conversion was 70%. The core-shell polymer in this example was prepared in a manner similar to Example 1, with the following exceptions: after venting at the end of the inner graft stage, BA 80 parts, DVB (55% active) 72.5 parts, t-BHP 27 parts of a 2.0% solution and SFS 19 parts of a 2.0% solution were fed to the reactor at 65° C. to prepare the intermediate sealer stage. Also, t-BHP 312 parts of a 2.0% solution was used instead of DIBHP in preparing the outer shell.

Example 3

The composition of this example is Bd/Sty//Sty//BA/DVB//MMA in a weight ratio of 76(75/25)//11//(50/50)//13. The core monomer conversion was 70%. The core-shell polymer in this example was prepared in a manner similar to Example 2, with the following exceptions: after venting at the end of the inner graft stage, BA 80 parts, DVB (55% active) 145 parts, t-BHP 40 parts of a 2.0% solution and SFS 28 parts of a 2.0% solution were fed to the reactor at 65° C. to prepare the intermediate graft stage.

Example 4

The composition of this example is Bd/Sty//Sty//BA//MMA in a weight ratio of 76(75/25)//11 //1//13. The core monomer conversion was 75%. The core-shell polymer in this example was prepared in a manner similar to Example 1, with the following exceptions: after venting at the end of the inner graft stage, BA 80 parts, DIBHP(53% active) 1 part and SFS 10 parts of a 2.0% solution were fed to the reactor at 65° C. to prepare the intermediate sealer stage.

Example 5

The composition of this example is Bd/Sty//Sty//BA/DVB//MMA in a weight ratio of 76(75/25)//11//4.4(91/9)//13. The core monomer conversion was 75%. The core-shell polymer in this example was prepared in a manner similar to Example 1, with the following exceptions: after venting at the end of the inner graft stage, BA 340 parts, DVB (55% active) 62 parts, DIBHP (53% active) 4 parts and SFS 50 parts of a 2.0% solution were fed to the reactor at 65° C. and reacted for 1 hour to prepare the intermediate sealer stage.

Example 6

The composition of this example is Bd/Sty//Sty//BA/DVB//MMA in a weight ratio of 76(75/25)//11//1.1(91/9)//13. The core monomer conversion was 68%. The core-shell polymer in this example was prepared in a manner similar to Example 1, with the following exceptions: after venting at the end of the inner graft stage, BA 80 parts, DVB (55% active) 15.5 parts, DIBHP (53% active) 1 part and SFS 12 parts of a 2.0% solution were fed to the reactor at 65° C. and reacted for 1 hour to prepare the intermediate sealer stage.

Example 7

The composition of this example is Bd/Sty//Sty//MMA in a weight ratio of 76(75/25)//11//13. The core-shell polymer in this example was prepared in a manner similar to Example 1, with the exception that the core monomer conversion was 75%.

Example 8

The composition of this example is Bd/Sty//Sty//BA/DVB//MMA in a weight ratio of 76(75/25)//11//1.2(83/17)//13. The core monomer conversion was 75%. The core-shell polymer in this example was prepared in a manner similar to Example 1, with the following exceptions: after venting at the end of the inner graft stage, BA 80 parts, DVB (55% active) 31 parts, DIBHP (53% active) 1 part and SFS 15 parts of a 2.0% solution were fed to the reactor at 65° C. and reacted for 1 hour to prepare the intermediate sealer stage.

Example 9

The composition and process of this example is the same as that of example 6 with the exception that the core monomer conversion was 80% prior to adding the inner graft stage.

Example 10

The composition of this example is Bd//Sty//Sty//MMA/DVB in a weight ratio of 76(75/25)//11//13(99/1) and contains no intermediate sealer stage. The core monomer conversion target was 70% prior to adding the inner graft stage. The core-shell polymer in this example was prepared in a manner similar to Example 1, with the following exceptions: after venting at the end of the inner graft stage, MMA 1105 parts, DVB(55% active) 22 parts, and deionized water 350 parts were added. DIBHP (53% active) 22 parts and SFS 270 parts of a 2.0% solution were fed simultaneously into the reactor to form the outer graft shell.

Example 11

The composition of this example is Bd/Sty//Sty//MMA in a weight ratio of 76(75/25)//11//13, and contains no intermediate sealer stage. The reaction temperature was 85° C. during most of the process.

To a suitable reactor was charged deionized water 6310 parts, TSPP 118 parts of a 5.0% solution, Bd/Sty 7/3 seed 700 parts of a 33% emulsion, sodium hydroxide 13 parts of 2.5% solution (or as needed for pH target of 9.8 to 10.0), Fe-EDTA 0.15 parts and deionized water 250 parts to rinse while stirring. The reactor was heated to 85° C.; At 85° C.; butadiene 4845 parts and styrene 1615 parts were fed to the reactor simultaneously with, t-BHP 16 parts, SFS 548 parts of 2.0% solution and KOL 876 parts of a 15.5% solution to form the core. Additional t-BHP 50 parts of a 2 % solution was added to reach a core monomer conversion of about 85%; this step prepared the core of the core-shell polymer. Afterwards, styrene 935 parts were fed to the reactor with t-BHP 9 parts, SFS 322 parts of a 2.0% solution and KOL 500 parts of a 15.5% solution to form the inner graft stage. The reaction was conducted at 85° C. for approximately 9 hours. During the last hour, the reaction was cooled to 70° C. The conversion for this stage was 95%. The reactor was vented at the end of this inner graft stage. Afterwards, MMA 1105 parts and deionized water 200 parts were added. t-BHP 232 parts of a 2.0% solution and SFS 155 parts of a 2.0% solution were fed simultaneously into the reactor to form the outer shell. The reaction was maintained at 75° C. for 2 hours and cooled to 65° C. over the last hour. Final conversion was 97–100%. The reaction was cooled to 40° C. and then stabilized as described previously. An emulsion of 48–50% solids was obtained.

Example 12

The composition of this example is Bd/Sty//Sty//MMA in a weight ratio of 76(75/25)//11//13 and contains no intermediate sealer stage. The core-shell polymer in this example was prepared in a manner similar to Example 1, except that the initiator in the outer shell stage was TBIC (6 parts) instead of DIBHP. The reaction temperature was 50° C. during most of the process.

Example 13

The composition of this example is Bd/Sty/DVB//Sty//MMA in a weight ratio of 76(75/25/1)//11//13, and contains no intermediate sealer stage. The reaction temperature was 50° C. during most of the process.

To a suitable reactor was charged deionized water 6310 parts, TSPP 118 parts of a 5.0% solution, butadiene seed 722 parts of a 33% emulsion, sodium hydroxide 13 parts of 2.5% solution (or as needed for pH target of 9.8 to 10.0), Fe-EDTA 0.15 parts and deionized water 250 parts to rinse while stirring. The reactor was heated to 50° C. At 50° C.; butadiene 4845 parts, styrene 1615 parts, and DVB 64 parts were fed to the reactor simultaneously with DIBHP (53% active) 49 parts, SFS 582 parts of 2.0% solution and KOL 469 parts of a 15.5% solution to form the core. The core monomer took over 24 hours to reach 95%, afterwards the reactor was vented. Continuing at 50° C., styrene 935 parts were fed to the reactor over three hours with DIBHP (53% active) 28 parts, SFS 342 parts of a 2.0% solution and KOL 275 parts of a 15.5% solution to form the inner graft stage. Additional SFS 166 parts of a 2.0% solution and DIBHP (53% active) 14 parts were added for three more hours at the end of the styrene feed. The reactor was vented at the end of this inner graft stage. Afterwards, MMA 1105 parts and deionized water 350 parts were added. DIBHP (53% active) 18 parts and SFS 208 parts of a 2.0% solution were fed simultaneously to form the outer shell. The outer shell reaction was conducted for 5–6 hours to a conversion of 100%. The reaction was cooled to 40° C. and then stabilized as described previously. An emulsion of 46% solids was obtained.

Comparative Example A

A core-shell impact modifier based upon Example 6 of U.S. Pat. No. 5,534,594, with minor modifications, was prepared. This comparative example illustrates that a Bd/Sty//Sty//MMA three-stage core-shell polymer of composition 70(75/25)//14//16 not containing an intermediate sealer stage has an average slurry particle size greater than 300 microns when coagulated above 20° C.

To a suitable reactor was charged deionized water 6368 parts, tetrasodium pyrophosphate (TSPP), 122 parts of a 5.0% solution, B/S 7/3 seed 67.5 parts of a 20% emulsion, sodium hydroxide 27 parts of 2.5% solution (or as needed for pH target of 9.8 to 10.0), Fe-EDTA 0.15 parts, SFS 22.5 parts of a 6.0% solution, t-BHP 2.7 parts, and deionized water 150 parts to rinse while stirring. The reactor was heated to 85° C. At 85° C.; butadiene 5148 parts and styrene 1571 parts were fed to the reactor simultaneously with, t-BHP 27 parts, SFS 304 parts of 6.0% solution and potassium oleate 761 parts of a 15.5% solution to prepare the core. After a core monomer conversion of about 77%, styrene 1125 parts were fed to the reactor with t-BHP 405 parts of 5.0% solution, SFS 281 parts of a 6.0% solution and deionized water 150 parts. The reaction was cooled to 65° C.

in the last two hours. Target conversion for this stage was 95%, and afterwards the reactor was vented and any butadiene was collected in a dry ice trap. After venting, MMA 1012 parts, butyl acrylate 112.5 parts, potassium oleate 110 parts of a 15.6% solution and deionized water 150 parts are added. t-BHP 232 parts of a 2.0% solution and SFS 155 parts of a 2.0% solution were fed simultaneously. The reaction was maintained at 65° C. for 3 hours. Final conversion was 100%. The reaction was cooled to 40° C. and then stabilized as described previously. An emulsion of 50–52% solids was obtained.

parts, MMA 700 parts, styrene 50 parts, cumene hydroperoxide 0.4 parts, deionized water 100 parts, t-BHP 169 parts of a 2.0% solution, and SFS 112.5 parts of a 2.0% solution were added and reacted for three hours. The reaction was cooled to 65° C. during the last hour until about 100% conversion was reached. The reactor was vented and any unreacted butadiene was collected in a dry ice trap. The reaction was cooled to 40° C. and then stabilized as described previously. An emulsion of 48–50% solids was obtained.

TABLE 2

Coagulation Results: Effect of Composition and Process Conditions

| | | Composition, parts | | | Process Conditions | | Coagulation Results | |
|---|---|---|---|---|---|---|---|---|
| Ex. | Core | Inner Graft Stage | Interm. Sealer Stage | Outer Shell | Rxn. Temp °C. | Core Monomer Conversion | Coag. Temp °C. | Avg. Slurry Particle Size, μm |
| 1 | Bd/Sty: 76(75/25) | Sty: 11 | none | MMA: 13 | 65 | 70% | 23 | 298 |
| 2 | Bd/Sty: 76(75/25) | Sty: 11 | BA/DVB: 1.5(67/33) | MMA: 13 | 65 | 70% | 30 | 168 |
| 3 | Bd/Sty: 76(75/25) | Sty: 11 | BA/DVB: 2(50:50) | MMA: 13 | 65 | 70% | 35 | 214 |
| 4 | Bd/Sty: 76(75/25) | Sty: 11 | BA: 1 | MMA: 13 | 65 | 75% | 25 | 201 |
| 5 | Bd/Sty: 76(75/25) | Sty: 11 | BA/DVB: 4.4(91:9) | MMA: 13 | 65 | 75% | 25 | 206 |
| 6 | Bd/Sty: 76(75/25) | Sty: 11 | BA/DVB: 1.1(91:9) | MMA: 13 | 65 | 68% | 25 | 264 |
| 8 | Bd/Sty: 76(75/25) | Sty: 11 | BA/DVB: 1.2(83:17) | MMA: 13 | 65 | 75% | 35 | 129 |
| 9 | Bd/Sty: 76(75/25) | Sty: 11 | BA/DVB: 1.1(91:9) | MMA: 13 | 65 | 80% | 30 | 233 |
| Comp. A | Bd/Sty: 70(75/25) | Sty: 14 | none | MMA: 16 | 85 | 77% | 25 | >300 ‡ |
| Comp. B | Bd/Sty/DVB: 70(75/25/1) | Sty/MMA: 15(93:7) | none | MMA/Sty: 15(93:7) | 50 | 70% | 25 | >300 ‡ |

‡ Particle size instrument plugged up from slurry particles larger than 300 microns.

Comparative Example B

A core-shell impact modifier based upon Example 4 of U.S. Pat. No. 5,534,594, with minor modifications, was prepared. This comparative example illustrates that a Bd/Sty/DVB//Sty/MMA//MMA/Sty three-stage core-shell polymer of composition 70(75/25/1)//15(93/7)//15(93/7) not containing an intermediate sealer stage has an average slurry particle size greater than 300 microns when coagulated above 20° C.

To a suitable reactor was charged deionized water 8600 parts, potassium oleate 339 parts of a 15.5% solution, TSPP 117 parts of 5.0% solution, Fe-EDTA 0.25 parts, NaOH 2 parts of a 20% solution, ferrous sulfate heptahydrate 0.14 parts, styrene 875 parts, DVB (55% active), DIBHP 11 parts, SFS 40 parts of a 5.0% solution, and butadiene 2625 parts. The temperature was adjusted to 50° C.; and maintained for 5–6 hours until the conversions was about 70%. Afterwards, the temperature was raised to 70° C. and potassium chloride 1125 parts of a 10% solution, deionized water 800 parts, styrene 700 parts, MMA 50 parts, cumene hydroperoxide 3.4 parts, and SFS 113 parts of a 2.0% solution were added and the temperature maintained at 70° C. After three hours, potassium oleate 226 parts of a 15.5% solution, sodium hydroxide 200 parts of a 2.5% solution, deionized water 500

TABLE 3

Bottle Drop Impact Results: Effect of Intermediate Sealer Stage Composition

| | Interm. Sealer Stage | Bottle Drop Impact, % failed at each drop height | | | | | |
|---|---|---|---|---|---|---|---|
| Ex. | Composition | 3 ft | 4 ft | 5 ft | 6 ft | 7 ft | 8 ft |
| 1 | none | 5 | 20 | 35 | 50 | 70 | 90 |
| 2 | BA/DVB: 1.5(67/33) | 25 | 55 | 75 | 95 | 95 | 95 |
| 3 | BA/DVB: 2(50:50) | 40 | 80 | 85 | 100 | — | — |
| 4 | BA: 1 | 0 | 0 | 5 | 20 | 20 | 35 |
| 5 | BA/DVB: 4.4(91:9) | 15 | 45 | 55 | 60 | 80 | — |
| 6 | BA/DVB: 1.1(91:9) | 5 | 15 | 25 | 35 | 40 | 65 |
| 8 | BA/DVB: 1.2(83:17) | 10 | 20 | 30 | 40 | 50 | 75 |
| 9 | BA/DVB: 1.1(91:9) | 5 | 10 | 25 | 45 | 65 | 85 |
| Comp. A | none | 45 | 55 | 80 | 100 | — | — |
| Comp. B | none | 55 | 100 | — | — | — | — |

TABLE 4

Bottle Drop Impact Results: Effect of Reaction Temperature

| Ex. | Rxn. Temp °C. | Composition Core | Inner Graft Stage | Outer Shell | Bottle Drop Impact, % failed at each drop height | | | | | |
|---|---|---|---|---|---|---|---|---|---|---|
| | | | | | 3 ft | 4 ft | 5 ft | 6 ft | 7 ft | 8 ft |
| † 11 | 85 | Bd/Sty: 76(75/25) | Sty: 11 | MMA: 13 | 30.9[a] | 65.1[a] | 76.6[a] | 89.3[a] | 94.5[a] | 97.3[a] |
| 7 | 65 | Bd/Sty: 76(75/25) | Sty: 11 | MMA: 13 | 0 | 5 | 20 | 35 | 45 | 60 |
| 10 | 65 | Bd/Sty: 76(75/25) | Sty: 11 | MMA/DVB: 13(99/1) | 5 | 10 | 15 | 25 | 40 | 50 |
| † 12 | 65 | Bd/Sty: 76(75/25) | Sty: 11 | MMA: 13 | 13.8[b] | 40.6[b] | 55.6[b] | 74.4[b] | 84.4[b] | 93.1[b] |
| † 13 | 50 | Bd/Sty/DVB: 76(75/25/1) | Sty: 11 | MMA: 13 | 28.8[c] | 65.0[c] | 76.3[c] | 87.5[c] | 92.5[c] | 97.5[c] |

† The level of the core-shell impact modifier in these examples was 12 phr.
[a]Average results for 40 impact modifiers prepared according to Example 11 at 85° C.
[b]Average results for 8 impact modifiers prepared according to Example 12 at 65° C.
[c]Average results for 4 impact modifiers prepared according to Example 13 at 50° C.

The results in Table 2 show that the average slurry particle size of coagulated MBS core shell polymers as taught by Troy (Comparative Examples A and B) are undesirably greater than 300 microns. The results in Table 2 also show that the addition of an intermediate sealer stage to an MBS core-shell polymer desirably provides an average slurry particle size well below 300 microns when coagulated at temperatures above about 20° C.

The results in Table 3 show that PVC bottles blended with the MBS core-shell polymers taught by Troy (Comparative Examples A and B having no intermediate sealer stage and prepared at 50° C. or 85° C.) generally have a greater percentage of failures when dropped than PVC bottles blended with MBS core-shell polymers of the present invention.

The results in Table 4 show that various MBS polymers prepared at about 65° C. provide impact-modified PVC bottles having a substantially lower rate of failure when dropped than similar core-shell polymers prepared at either 50° C. or 85° C.

I claim:

1. A core-shell impact modifier composition comprising:
   (A) from about 70 to about 85 parts of a core comprising from about 15 to about 35 percent by weight of units derived from at least one vinyl aromatic monomer, and from about 65 to about 85 percent by weight of units derived from at least one diolefin monomer;
   (B) from about 8 to about 14 parts of an inner graft stage comprising at least one vinyl aromatic monomer or at least one C1–C4 alkyl methacrylate monomer;
   (C) from about 0.1 to about 5 parts of an intermediate sealer stage consisting essentially of at least one of the following monomers: a C1–C8 alkyl acrylate or a polyunsaturated crosslinker; and
   (D) from about 10 to about 16 parts of an outer shell comprising at least one C1–C4 alkyl (meth)acrylate monomers or at least one vinyl aromatic monomer,
   wherein the intermediate sealer stage improves the coverage of the outer shell on the inner stage and core.

2. The core-shell impact modifier of claim 1 wherein the polyunsaturated crosslinker of the intermediate sealer stage (C) is divinylbenzene and the C1–C8 alkyl acrylate monomer is butyl acrylate.

3. The core-shell impact modifier of claims 1 or 2 wherein the vinyl aromatic monomer is selected from styrene, para-methyl styrene, alpha-methyl styrene, chlorostyrene, vinyl toluene, bromostyrene, dibromostyrene, tribromostyrene, iso-propenyl napthalene, or vinyl naphthalene, and where the diolefin monomer is butadiene.

4. A polymer blend composition, comprising:
   (I) one or more matrix polymers; and
   (II) a core-shell impact modifier, the core-shell impact modifier comprising:
      (A) from about 70 to about 85 parts of a core comprising from about 15 to about 35 percent by weight of units derived from at least one vinyl aromatic monomer, and from about 65 to about 85 percent by weight of units derived from at least one diolefin monomer;
      (B) from about 8 to about 14 parts of an inner graft stage comprising at least one vinyl aromatic monomer or at least one C1–C4 alkyl methacrylate monomer;
      (C) from about 0.1 to about 5 parts of an intermediate sealer stage consisting essentially of at least one of the following monomers: a C1–C8 alkyl acrylate or a polyunsaturated crosslinker; and
      (D) from about 10 to about 16 parts of an outer shell comprising at least one C1–C4 alkyl (meth)acrylate monomers or at least one vinyl aromatic monomer,
      wherein the intermediate sealer stage improves the coverage of the outer shell on the inner stage and core, and
   wherein the weight ratio of (I):(II) is about 99:1 to about 70:30.

5. The polymer blend according to claim 4 wherein the matrix polymer is poly(vinyl chrloride).

6. A process for preparing a core-shell impact modifier emulsion having a rubbery core weight fraction exceeding 70% which comprises:
   (A) polymerizing in emulsion, a first mixture of monomers, comprising from about 65% to about 85% of a diolefin monomer and about 15% to about 35% of at least one vinyl aromatic monomer, in the presence of an emulsifier and a free-radical initiator, until 60%–90% conversion of the monomers to polymer has been achieved;

(B) continuing the polymerization of the first mixture of monomers while adding a second mixture of monomers which mixture comprises at least one vinyl aromatic monomer or a C1–C4 alkyl methacrylate monomer;

(C) continuing the polymerization of the second mixture of monomers to at least 90 % conversion to polymer has been achieved;

(D) adding a third mixture of monomers and a free-radical initiator which mixture comprises at least one monomer selected from the group consisting of C1–C8 alkyl acrylates and polyunsaturated crosslinkers; and (E) adding a fourth mixture of monomers, which mixture comprises at least one C1–C4 alkyl methacrylate monomer or at least one vinyl aromatic monomer, adding a free-radical initiator, and continuing the polymerization until at least 95% conversion to polymer has been achieved, wherein the reaction temperature during steps (A) through (E) is in the range of from 20° C. to 100° C.

7. The process of claim 6 wherein the C1–C8 alkyl acrylate monomer in step (D) is butyl acrylate.

8. The process according to claim 6 wherein the reaction temperature is in the range of from 55° C. to 80° C.

9. An article produced from a polymer blend, the polymer blend comprising:

(I) one or more matrix polymers; and (II) a core-shell impact modifier, the core-shell impact modifier comprising:

(A) from about 70 to about 85 parts of a core comprising from about 15 to about 35 percent by weight of units derived from at least one vinyl aromatic monomer, and from about 65 to about 85 percent by weight of units derived from at least one diolefin monomer;

(B) from about 8 to about 14 parts of an inner graft stage comprising at least one vinyl aromatic monomer or at least one C1–C4 alkyl methacrylate monomer;

(C) from about 0.1 to about 5 parts of an intermediate sealer stage consisting essentially of at least one of the following monomers: a C1–C8 alkyl acrylate or a polyunsaturated crosslinker; and (D) from about 10 to about 16 parts of an outer shell comprising at least one C1–C4 alkyl (meth)acrylate monomers or at least one vinyl aromatic monomer, wherein the intermediate sealer stage improves the coverage of the outer shell on the inner stage and core, and wherein the weight ratio of (I):(II) is about 99:1 to about 70:30.

10. A core-shell impact modifier composition, comprising:

(A) from about 70 to about 85 parts of a core comprising from about 15 to about 35 percent by weight of units derived from at least one vinyl aromatic monomer, and from about 65 to about 85 percent by weight of units derived from at least one diolefin monomer;

(B) from about 8 to about 14 parts of an inner graft stage comprising at least one vinyl aromatic monomer or at least one C1–C4 alkyl methacrylate monomer;

(C) from 0.5 to 2 parts of an intermediate sealer stage comprising at least one of the following monomers: a C1–C8 alkyl acrylate or a polyunsaturated crosslinker; and (D) from about 10 to about 16 parts of an outer shell comprising at least one C1–C4 alkyl (meth)acrylate monomers or at least one vinyl aromatic monomer, wherein the intermediate sealer stage improves the coverage of the outer shell on the inner stage and core.

11. A core-shell impact modifier composition, comprising:

(A) from about 70 to about 85 parts of a core comprising from about 15 to about 35 percent by weight of units derived from at least one vinyl aromatic monomer, and from about 65 to about 85 percent by weight of units derived from at lea stone diolefin monomer;

(B) from about 8 to about 14 parts of an inner graft stage comprising at least one vinyl aromatic monomer or at least one C1–C4 alkyl methacrylate monomer;

(C) from about 0.1 to about 5 parts of an intermediate sealer stage consisting essentially of at least one C1–C8 alkyl acrylate monomer; and (D) from about 10 to about 16 parts of an outer shell comprising at least one C1–C4 alkyl (meth)acrylate monomers or at least one vinyl aromatic monomer, wherein the intermediate sealer stage improves the coverage of the outer shell on the inner stage and core.

12. A polymer product having a slurry particle size smaller than 300 microns, the polymer product produced by the process of:

(A) polymerizing in emulsion, a first mixture of monomers, comprising from about 65% to about 85% of a diolefin monomer and about 15% to about 35% of at least one vinyl aromatic monomer, in the presence of an emulsifier and a free-radical initiator, until 60%–90% conversion of the monomers to polymer has been achieved;

(B) continuing the polymerization of the first mixture of monomers while adding a second mixture of monomers which mixture comprises at least one vinyl aromatic monomer or a C1–C4 alkyl methacrylate monomer;

(C) continuing the polymerization of the second mixture of monomers to at least 90% conversion to polymer has been achieved;

(D) adding a third mixture of monomers and a free-radical initiator to form an intermediate sealer stage present in an amount of from 0.1 to about 5 parts, which mixture comprises at least one monomer selected from the group consisting of C1–C8 alkyl acrylates and polyunsaturated crosslinkers; and (E) adding a fourth mixture of monomers, which mixture comprises at least one C1–C4 alkyl methacrylate monomer or at least one vinyl aromatic monomer, adding a free-radical initiator, and continuing the polymerization until at least 95% conversion to polymer has been achieved, wherein the reaction temperature during steps (A) through (E) is in the range of from 20° C. to 100° C., and (F) coagulating the emulsion prepared during steps (A) through (E) at a temperature above 20° C.

* * * * *